Figure 1:
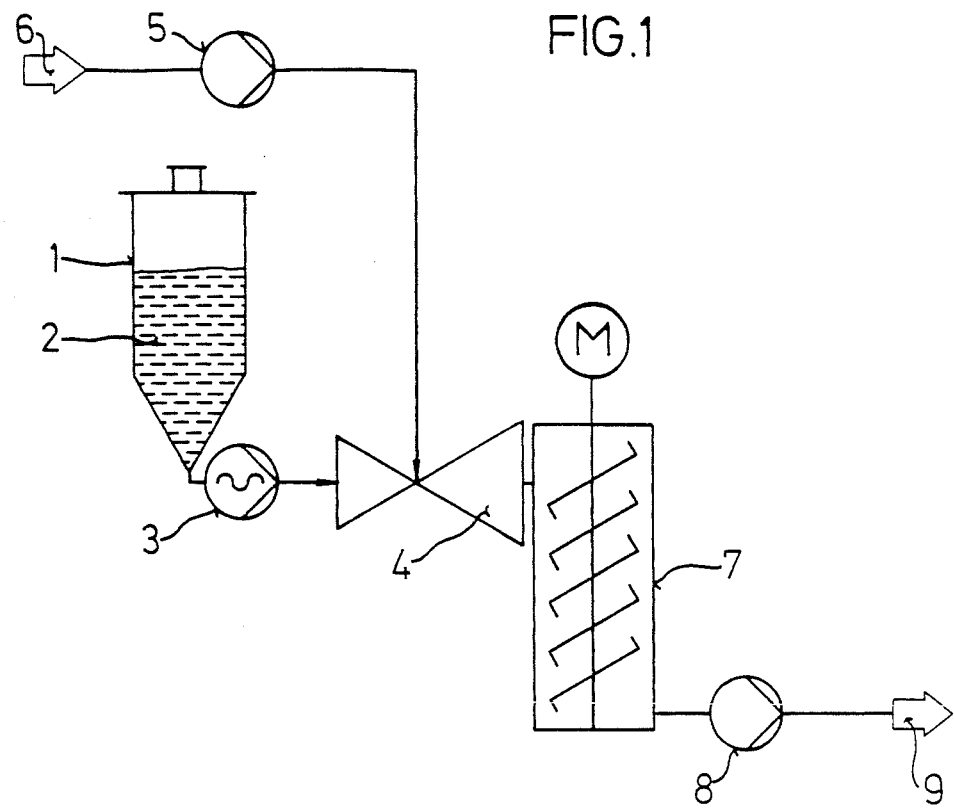

United States Patent [19]

Kiener et al.

[11] Patent Number: 4,871,373
[45] Date of Patent: Oct. 3, 1989

[54] CONTINUOUS PREPARATION OF SOLUTIONS OF LOW VISCOSITY SOLVENTS AND HIGH VISCOSITY, PASTY PRODUCTS

[75] Inventors: Volker Kiener, Weisenheim; Guenther Nonn, Dackenheim; Bernhard Seid, Frankenthal; Harald Schewski, Weisenheim; Karl Buellmeyer, Frankenthal, all of Fed. Rep. of Germany

[73] Assignee: BASF Aktiengesellschaft, Ludwigshafen, Fed. Rep. of Germany

[21] Appl. No.: 134,107

[22] Filed: Dec. 17, 1987

[30] Foreign Application Priority Data

Dec. 24, 1986 [DE] Fed. Rep. of Germany ....... 3644459

[51] Int. Cl.$^4$ ............................................. B01D 1/30
[52] U.S. Cl. .......................................... 23/306; 8/110; 423/265; 423/515; 252/188.2; 252/188.21; 252/188.22; 252/188.23
[58] Field of Search ................. 23/306; 423/515, 265; 252/188.2, 188.21, 188.22, 188.23, 188.24; 8/110

[56] References Cited

U.S. PATENT DOCUMENTS

| | | | |
|---|---|---|---|
| 3,286,992 | 11/1966 | Armeniades et al. | 423/DIG. 9 |
| 3,804,944 | 4/1974 | Kise et al. | 423/265 |
| 3,839,217 | 10/1974 | Owen et al. | 423/515 |
| 3,839,218 | 10/1974 | Owen et al. | 252/188.23 |
| 3,957,253 | 5/1976 | Barton et al. | 366/132 |
| 4,283,303 | 8/1981 | Ellis | 423/265 |
| 4,534,954 | 8/1985 | Little et al. | 423/265 |
| 4,614,647 | 9/1986 | Appl et al. | 423/515 |
| 4,676,961 | 6/1987 | Appl et al. | 252/188.23 |

FOREIGN PATENT DOCUMENTS 53-75197 7/1978 Japan .................................. 423/515

Primary Examiner—John Doll
Assistant Examiner—Robert M. Kunemund
Attorney, Agent, or Firm—Keil & Weinkauf

[57] ABSTRACT

Solutions of low viscosity solvents and high viscosity, pasty products, for example water and sodium dithionite formulations, are prepared in a continuous manner in a matter of seconds in static and dynamic mixers connected in series while at the same time the ingress of air is avoided.

2 Claims, 1 Drawing Sheet

CONTINUOUS PREPARATION OF SOLUTIONS OF LOW VISCOSITY SOLVENTS AND HIGH VISCOSITY, PASTY PRODUCTS

The present invention relates to a process for preparing solutions of low viscosity solvents and high viscosity, pasty products, for example water and sodium dithionite formulations (written hereinafter as NDTF).

Solutions of water and NDTF are used preferably as bleaching and reducing agents, for example in papermaking and in the textile industry as a reducing agent in dyeing.

To prepare these solutions, there are two possible combinations of starting material:

(a) water and pulverulent sodium dithionite and
(b) water and high viscosity, pasty NDTF.

Solutions of water and pulverulent sodium dithionite are prepared using tried and tested powder-dissolvers, for example from Bran und Lubbe.

However, the preparation of solutions from pulverulent sodium dithionite has serious disadvantages; for example, in the past the handling of sodium dithionite in powder form has given rise to fires due to autoignition of the powder. Furthermore, it has been found that air oxidation of the solution due to excessively long residence times of the solution in the powder-dissolvers causes losses of active substance. The powder dissolvers customarily used in industry are unsuitable for dissolving high viscosity, pasty NDTF for lack of mixing power.

Solutions of water and high viscosity, pasty NDTF are generally prepared using dissolvers comprising a makeup vessel and a dispersing unit. In some dissolvers, the dispersing unit is directly integrated in the makeup vessel.

Where the dissolver comprises a makeup vessel and a dispersing unit, the water introduced into the makeup vessel is pumped through the dispersing unit and subsequently back into the makeup vessel. At the same time the high viscosity, pasty NDTF to be dissolved is charged to the makeup vessel via a fill orifice and flows toge-ther with the water through the dispersing unit. This operation is continued until an adequate and homogeneous solution of sodium dithionite in water is obtained.

This method of operation produces various effects.

1. The pastelike constituents of the product are divided and the particles present therein comminuted, so that passing through the dispersing unit makes available a larger surface area for the attack of the solvent.

2. The incipiently dissolved surfaces are sheared off in the dispersing unit in special shearing gaps and edges.

3. The highly turbulent flow serves to provide uninterrupted contact between the surface of the particles and the solvent. The solvent is free to diffuse into the solid particles again until the particles transported back to the makeup vessel are aspirated out again.

The homogeneous and solids-free solutions required are frequently not producible, since undissolved, solid particles settle out in the makeup vessel and in the downstream pipework and fittings as a result of the difference in density; this causes mechanical problems which cause the dispersing process to cease, which results in high losses of active substance. In addition, discharged, undissolved particles have an adverse effect on the subsequent bleaching or dyeing process. Furthermore, it is found that solutions prepared from NDTF and water are subject to substantial losses of active substance on account of the delays and the ingress of atmospheric oxygen.

It is an object of the present invention to provide a process which, on the one hand, makes it possible to prepare a homogeneous solution of water and NDTF where the concentration of the solution is settable close to the solubility limit and, on the other hand, avoids losses of active substance due to long delays in the preparation and distribution of the solution and due to air ingress, while at the same time eliminating mechani-cal problems.

We have found that this object is achieved by preparing the solution in a matter of seconds in static and dynamic mixers connected in series.

Further features of the invention are revealed in the subclaims.

Figure 2:
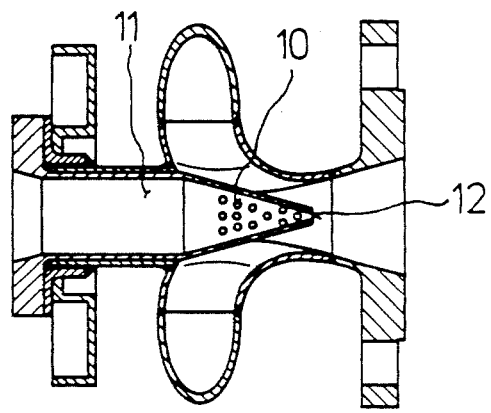

The process according to the invention is explained in more detail in what follows by reference to a drawing, where FIG. 1 shows a flow sheet for the process, and
FIG. 2 shows a static mixer according to the invention.

A stock reservoir vessel (1), which is equipped with an outflow cone, is charged with a high viscosity, pasty NDTF (2). A conveyor element (3) is used to charge the NDTF through a pipeline to a static mixer (4). At the same time a conveyor element (5) is used to charge water (6) to the static mixer. It is this static mixer, which will be described in detail hereinafter, where the preparation of highly concentrated, homogeneous solutions in short residence times begins. The static mixer is immediately adjoined, without any dead space, by a dynamic mixer (7), so that the solution to be prepared immediately arrives in the dynamic mixer for the next treatment. A further conveyor element (8) is used to charge the ready-prepared, highly concentrated, homogeneous solution (9) to a use function, for example for bleaching of woodpulp. An advantageous conveyor element (3) was found to be an eccentric screw pump of infinitely variable speed of rotation.

The continuous preparation of highly concentrated homogeneous solutions in short residence times requires extremely good mass transfer conditions. The solid particles present in the NDTF were found to have an average particle size of around 160 pm. For this reason, first a precomminution and surface area enlargement and also incipient dissolving of the highly viscous, pasty NDTF were carried out in the static mixer by forcing the NDTF through a plurality of bores (10) uniformly distributed over the periphery of a conical nozzle (11); see FIG. 2. The larger bore (12) arranged at the end of the nozzle serves as a blowoff orifice which makes possible the flowoff of larger solid particle agglomerates, ascribable to inhomogeneities, thereby preventing blockage of the bores (10) on nozzle (11). Such a state can also arise after stoppage or startup of the dissolver when the highly viscous, pasty substance is in contact with water and larger solid particles form at the surface as a consequence of supersolubilities. Compared with conical diffuserlike or cylindrical components where no such blowoff orifice is present, appreciable advantages were obtained.

In the zone where the thin strands of paste, approximately 2 mm in diameter, emerge from the bores the water is guided theretoward and passed at high speed. As a consequence, the strands of paste are initially cut off and subsequently divided and dissolved. The weights of solution obtainable here are proportional to the concentration gradient. The concentration gradient in turn is inversely proportional to the thickness of the boundary layer, or diffusion zone, and the concentration of the liquid surrounding the particles, ie. directly proportional to the rate of transport of more highly concentrated solution away from the vicinity of the paste particles through turbulent convection. The geometry in this zone of the static mixer ensures that the flow is always highly turbulent.

An essential condition for the production of homogeneous solutions is a constant flowoff of liquid and of still undissolved particles of solid. Owing to the construction of the static mixer without a dead space, solid undissolved particles cannot settle out and/or accumulate.

The dynamic mixer has the function of rapidly further comminuting the previously substantially comminuted and incipiently particles of solid dissolved and of separating fragments of the solid from each other and distributing them uniformly in the liquid. The mass transfer coefficient, which is seen as pivotal for speeding up dissolution, must be further increased in the dynamic mixer compared with the static mixer. Since temperature changes have hardly any effect in the dissolving of NDTF in water, the only factors left whereby influence can be exerted are to increase the diffusion coefficient and power densities in dynamic mixers. Extremely high mass transfer coefficients and short dissolving times were obtained in low-boiling, high-turbulence shearing gaps. A particularly useful way of providing their function has proved to be an apparatus of multistage construction, which gets narrower from stage to stage and has low-volume shearing gaps. Using such an apparatus together with an upstream static mixer it is possible to turn NDTF and water into completely homogeneous solutions of up to 220 g of water/l in dissolving times of the order of a few seconds. At lower concentrations, the outstanding performance of the static mixer makes it possible to perform the function with less powerful apparatus. The conditions under which the NDTF to be dissolved and water are charged to the dissolver have a significant influence on the homogeneity of the solution to be prepared. For instance it is necessary to ensure, in particular in the metering of the highly viscous, pasty NDTF, that almost pulsation-free mass flows are obtained. The dissolving process according to the invention also has the advantage that the mass flows are very accurately controlled by measuring and regulating means.

Owing to the fact that the solution is prepared in an enclosed environment and subsequently distributed in an unspecified manner not essential to the invention, but without intermediate or buffer vessel, any ingress of air is avoided. To obtain short distribution times it is possible, if narrow pipe cross-sections are used, to connect in a pump by means of which the solution is transferred, for example into a bleaching process. When solutions were prepared and distributed in this way, we found no losses of active substance compared with the NDTF starting material.

We claim:

1. A continuous process for preparing a homogeneous solution of water and paste-like formulation of sodium dithionite which comprises passing the water and said sodium dithionite formulation first through a static mixer which consists of a plurality of bores uniformly distributed over the periphery of a conical nozzle and a larger bore arranged at the end of the nozzle which serves as a flow blowoff orifice and thence through a dynamic mixer while avoiding the ingress of air therein, with the passage through both mixers being accomplished in a matter seconds, and with said static and dynamic mixers being arranged such that they are connected in series without any dead space therebetween.

2. A process as claimed in claim 1, wherein high degrees of turbulence are obtained in the static mixer.